(12) United States Patent
Moghaddam et al.

(10) Patent No.: US 11,151,181 B2
(45) Date of Patent: *Oct. 19, 2021

(54) MINING TEXTUAL FEEDBACK

(71) Applicant: eBay Inc., San Jose, CA (US)

(72) Inventors: Samaneh Abbasi Moghaddam, Sunnyvale, CA (US); Marco Pennacchiotti, Mountain View, CA (US); Thomas Normile, Los Altos, CA (US)

(73) Assignee: eBay Inc., San Jose, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 16/205,619

(22) Filed: Nov. 30, 2018

(65) Prior Publication Data

US 2019/0095823 A1 Mar. 28, 2019

Related U.S. Application Data

(63) Continuation of application No. 14/586,789, filed on Dec. 30, 2014, now Pat. No. 10,176,434.

(Continued)

(51) Int. Cl.
*G06N 20/00* (2019.01)
*G06F 16/35* (2019.01)
(Continued)

(52) U.S. Cl.
CPC .......... *G06F 16/355* (2019.01); *G06F 16/334* (2019.01); *G06F 16/3322* (2019.01); *G06F 16/345* (2019.01); *G06F 16/353* (2019.01); *G06F 40/30* (2020.01); *G06N 20/00* (2019.01); *G06N 99/00* (2013.01); *G06Q 30/0282* (2013.01)

(58) Field of Classification Search
None
See application file for complete search history.

(56) References Cited

U.S. PATENT DOCUMENTS 7,233,843 B2 6/2007 Budhraja et al.
8,060,259 B2 11/2011 Budhraja et al.
(Continued)

OTHER PUBLICATIONS

Zhang, et al., Random-Forests-Based Network Intrusion Detection Systems, IEEE Transactions On Systems, Man, and Cybernetics—Part C: Applications and Reviews, vol. 38, No. 5, Sep. 2008, pp. 649-659 (Year: 2008).*

(Continued)

*Primary Examiner* — Wilbert L Starks
(74) *Attorney, Agent, or Firm* — Schwegman Lundberg & Woessner, P.A.

(57) ABSTRACT

Methods, systems, and apparatus for mining feedback are described. A set of one or more lexical patterns associated with one or more of a suggestion and a defect report are determined and the set of one or more lexical patterns are matched against a plurality of feedback items to generate a distance learning training set. A distance learning technique is applied to the distance learning training set to generate a distance learning model and the distance learning model is used to identify one or more candidate feedback items of the plurality of feedback items, each of which is one or more of a candidate suggestion and a candidate defect report.

20 Claims, 13 Drawing Sheets

Related U.S. Application Data

(60) Provisional application No. 62/058,038, filed on Sep. 30, 2014.

(51) Int. Cl.
  *G06Q 30/02* (2012.01)
  *G06F 16/34* (2019.01)
  *G06F 40/30* (2020.01)
  *G06F 16/332* (2019.01)
  *G06F 16/33* (2019.01)
  *G06N 99/00* (2019.01)

(56) References Cited

U.S. PATENT DOCUMENTS

| | | |
|---|---|---|
| 8,401,710 B2 | 3/2013 | Budhraja et al. |
| 8,713,017 B2 | 4/2014 | Lu et al. |
| 10,176,434 B2 * | 1/2019 | Moghaddam ........... G06F 40/30 |
| 2016/0092791 A1 | 3/2016 | Moghaddam et al. |

OTHER PUBLICATIONS

Zhang et al., "Random-Forests-Based Network Intrusion Detection Systems", IEEE Transactions on Systems, Man, and Cybernetics—Part C, vol. 38, No. 5, Sep. 2008, pp. 649-659.

Non-Final Office Action received for U.S. Appl. No. 14/586,789, dated Apr. 20, 2017, 22 pages.

Applicant Initiated Interview Summary received for U.S. Appl. No. 14/586,789, dated May 12, 2017, 3 pages.

Response to Non-Final Office Action filed on Jul. 19, 2017 for U.S. Appl. No. 14/586,789, dated Apr. 20, 2017, 8 pages.

Non-Final Office Action received for U.S. Appl. No. 14/586,789, dated Nov. 1, 2017, 28 pages.

Applicant Initiated Interview Summary received for U.S. Appl. No. 14/586,789, dated Dec. 28, 2017, 3 pages.

Response to Non-Final Office Action filed on Jan. 25, 2018 for U.S. Appl. No. 14/586,789, dated Nov. 1, 2017, 22 pages.

Final Office Action received for U.S. Appl. No. 14/586,789, dated May 31, 2018, 33 pages.

Response to Final Office Action filed on Jul. 31, 2018, for U.S. Appl. No. 14/586,789, dated May 31, 2018, 11 pages.

Notice of Allowance received for U.S. Appl. No. 14/586,789, dated Aug. 29, 2018, 10 pages.

* cited by examiner

MINING TEXTUAL FEEDBACK

CROSS-REFERENCE TO RELATED APPLICATION

This application is a continuation of U.S. patent application Ser. No. 14/586,789, filed Dec. 30, 2014, which application claims priority to U.S. Provisional Patent Application Ser. No. 62/058,038 filed on Sep. 30, 2014, which applications and publications are incorporated herein by reference in their entirety.

TECHNICAL FIELD

The present application relates generally to the mining of text, and more specifically, in one example, to mining textual feedback for suggestions and defect reports.

BACKGROUND

A growing variety of applications, including online applications, are enabling users to perform an increasing number of tasks. For example, consumers often shop online for a wide variety of products and services and may conduct searches for information, such as pricing information, for an item. The users of an application, or any product or service, may provide feedback on the application, the product, the service, and the like. The feedback may include suggestions for improving the application, product, and/or service, and/or may identify a defect associated with the application, product, and/or service.

BRIEF DESCRIPTION OF THE DRAWINGS

Some embodiments are illustrated by way of example and not limitation in the figures of the accompanying drawings, in which.

DETAILED DESCRIPTION

Figure 1A:
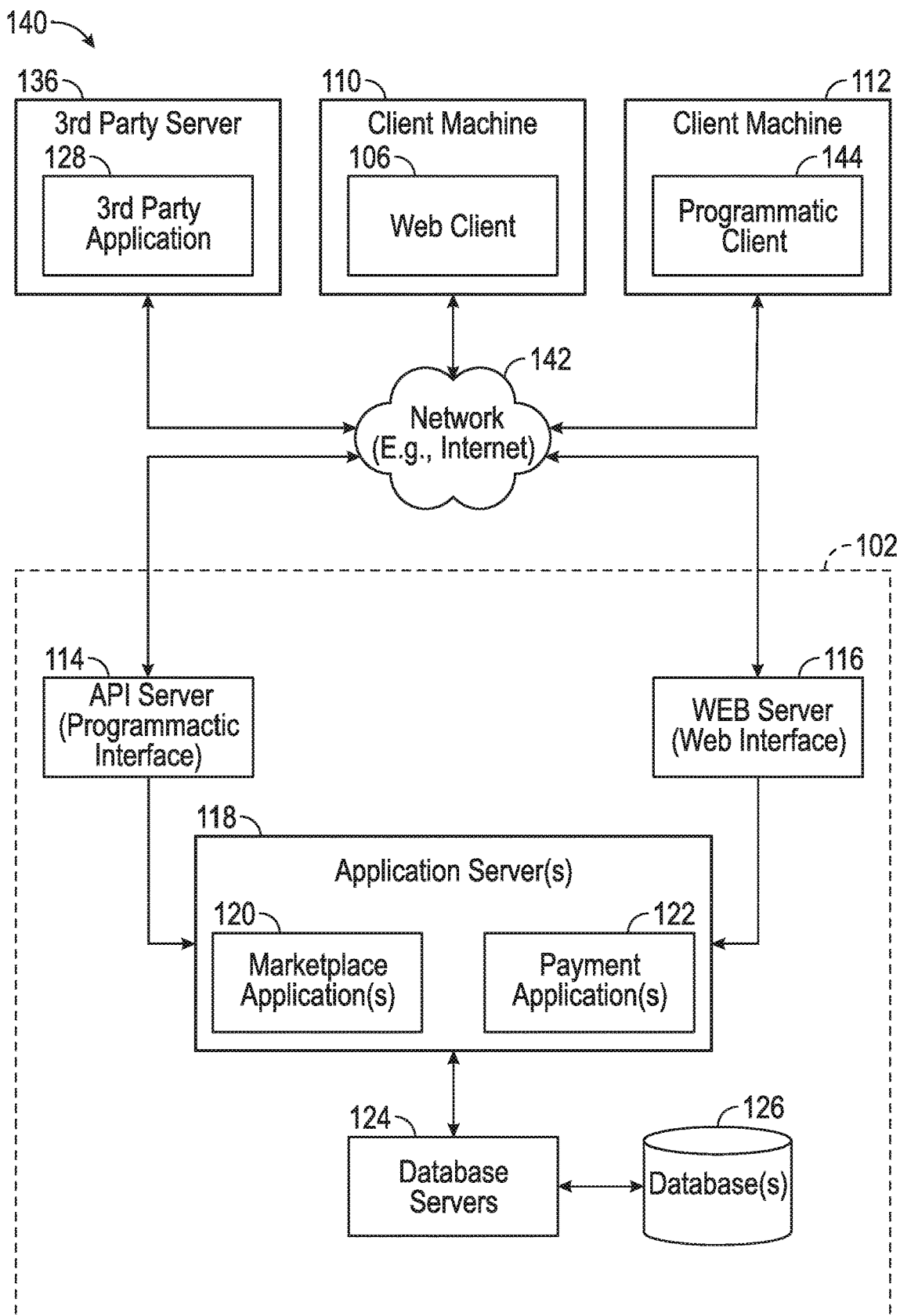
FIG. 1A is a network diagram depicting a client-server system, in accordance with an example embodiment.

In the following detailed description of example embodiments, reference is made to specific examples by way of drawings and illustrations. These examples are described in sufficient detail to enable those skilled in the art to practice these example embodiments, and serve to illustrate how the invention may be applied to various purposes or embodiments. Other embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, methods, systems, and apparatuses for mining textual feedback and extracting actionable information from feedback are described. The feedback may be provided by a user of an application, a product, a service, and the like. Information is considered actionable if, for example, a business can use it to improve its application, product, and/or service. A method for summarizing extracted suggestions and identified defects is also described. The disclosed techniques may also be used for other applications, such as detecting spam.

Customer satisfaction is considered one of the key performance indicators within businesses. In the current competitive marketplace where businesses compete for customers, managing customer satisfaction is essential. One of the important sources of customer feedback is textual feedback. Feedback may be obtained, for example, from product review sites, community blogs, forums, directly from users, and the like.

A suggestion, or improvement request, may be, for example, a feedback item that suggests an addition, change, removal, and/or improvement of a feature of an application, a product, a service, and the like. A defect report may be, for example, a feedback item that points out a difficulty, error, bug, defect, inability, and the like of a product, a service, an application, and the like.

In one example embodiment, textual feedback from a user of an application, a product, and/or a service is mined for suggestions and/or identifications of a defect (e.g., a defect report). The suggestion may be for an improvement of the application, product, or service and the defect may be a defect of the application, product, or service. In one example embodiment, a set of lexical/Part-of-Speech (PoS) patterns is mined from sample textual feedback items and is used to identify defect reports and/or suggestions within the feedback. The resulting patterns may be used as positive cases for training a distant learning technique.

In one example, assume $P=(P_1, P_2, \ldots, P_i)$ is a set of items (e.g., applications, products, and/or services). For each item $P_i$, there is a set of feedback comments $R_i=\{d_1, d_2, \ldots, d_N\}$ (also known as feedback items). As described above, each feedback item may contain a suggestion for an improvement and/or a defect report. A suggestion for an improvement may suggest or request the addition, modification, or removal of a feature of the application, product, and/or service. A first example of a suggestion for an improvement is "[t]he only thing I would like to see on this mobile application is the option to send an invoice and print a shipping label." A second example of a suggestion for an improvement is "[n]eeds ability to add an item to a specific watch list and a way to organize the watch lists."

A defect report may point out a difficulty, error, bug, defect, and/or missing capability of the application, product, and/or service to be fixed or otherwise resolved. An example of a defect report is "[i]t lacks the ability to move a saved item from your backer back into your basket again for purchase." A second example of a defect report is "[y]ou cannot send an invoice through this application."

In one example embodiment, given a set of reviews about item $P_i$, the major defects reported about $P_i$ in the feedback items and the improvements suggested or requested by customers are identified and extracted from the set of feedback comments $R_i$. The extracted suggestions and defect reports (also known as blockages) may be grouped by topic and summarized for easy access by a user.

Mining Defect Reports and Suggestions

In one example embodiment, a corpus of feedback items is manually analyzed to identify a set of lexical/PoS patterns that are associated with a suggestion and/or a defect report. For example, a set of patterns may be identified that correspond to suggestions and/or defect reports, such as "there should be <determiner> . . . " or "I wish . . . " for extracting suggestions and "I cannot <verb>" or "<negation> allow|let USER" for extracting defects.

A distant supervision-learning technique may be used to locate defect reports and suggestions that do not match any of the identified patterns, where the training data consists of feedback items that match one or more of the manually identified patterns. Although using the results of the pattern matching as positive cases in training the model can result in false positives, the use of the pattern matching results serve to provide supervision from a distance.

Summarizing Suggestions and Blockages

While categorizing customer feedback as "reporting a defect" or "requesting an improvement" may be useful for enabling business owners to improve their products, summarizing the extracted defects and suggestions may make processing the feedback items more efficient. In one example embodiment, sentences in each feedback item are first classified as containing a defect report and/or suggestion. A classifier, such as a support vector machine (SVM) classifier, is then trained using manually labeled data to classify each sentence in the extracted feedback as a positive case (i.e., contains a suggestion and/or defect report) or a negative case (i.e., does not contain a suggestion or defect report). In addition to using the defined patterns, two classifiers may also be trained for identifying target sentences (i.e., sentences containing a defect report and/or suggestion) in each feedback item. One classifier is trained on all feedback items independent of their feedback-level labels, and another classifier is trained on only feedback positively labeled for that task (i.e., a defect sentence classifier trained only on feedback labeled as a defect report).

Finally, to summarize the identified sentences, an application of Latent Dirichlet Allocation (LDA) may be used. The approach not only clusters similar feedback items, but also identifies the top k topics of that cluster. The LDA may be applied on a simple bag-of-words (BoW) as a baseline and the results may be compared with extracted topics from noun phrases, verb phrases, and bi-terms. In the baseline (i.e., BoW), each feedback item is represented as the bag (multiset) of its words, disregarding grammar and word order, where the frequency of each word is used as a feature for training the model. By using other features (bag of noun/verb phrases or bag of bi-grams), the PoS tag and the order of words may be considered. The extracted sentences may also be summarized by applying the Latent Dirichlet Allocation on different feature sets.

FIG. 1A is a network diagram depicting a client-server system 140, in accordance with an example embodiment. A networked system 102, in the example forms of a network-based marketplace or publication system, provides server-side functionality, via a network 142 (e.g., the Internet or a Wide Area Network (WAN)), to one or more clients. FIG. 1A illustrates, for example, a web client 106 (e.g., a browser, such as the Internet Explorer® browser developed by Microsoft® Corporation of Redmond, Wash. State) and a programmatic client 144 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The marketplace applications 120 are examples of applications regarding which a user may provide suggestions and/or defect reports. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While both the marketplace and payment applications 120 and 122 are shown in FIG. 1A to form part of the networked system 102, it will be appreciated that, in alternative embodiments, the payment applications 122 may form part of a payment service that is separate and distinct from the networked system 102.

Further, while the client-server system 140 shown in FIG. 1A employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 144 accesses the various services and functions provided by the marketplace and payment applications 120 and 122 via the programmatic interface provided by the API server 114. The programmatic client 144 may, for example, be a seller application (e.g., the Turbo Lister application developed by eBay Inc., of San Jose, Calif.) to enable sellers to author and manage listings on the networked system 102 in an offline manner, and to perform batch-mode communications between the programmatic client 144 and the networked system 102.

FIG. 1A also illustrates a third party application 128, executing on a third party server 136, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 1B:
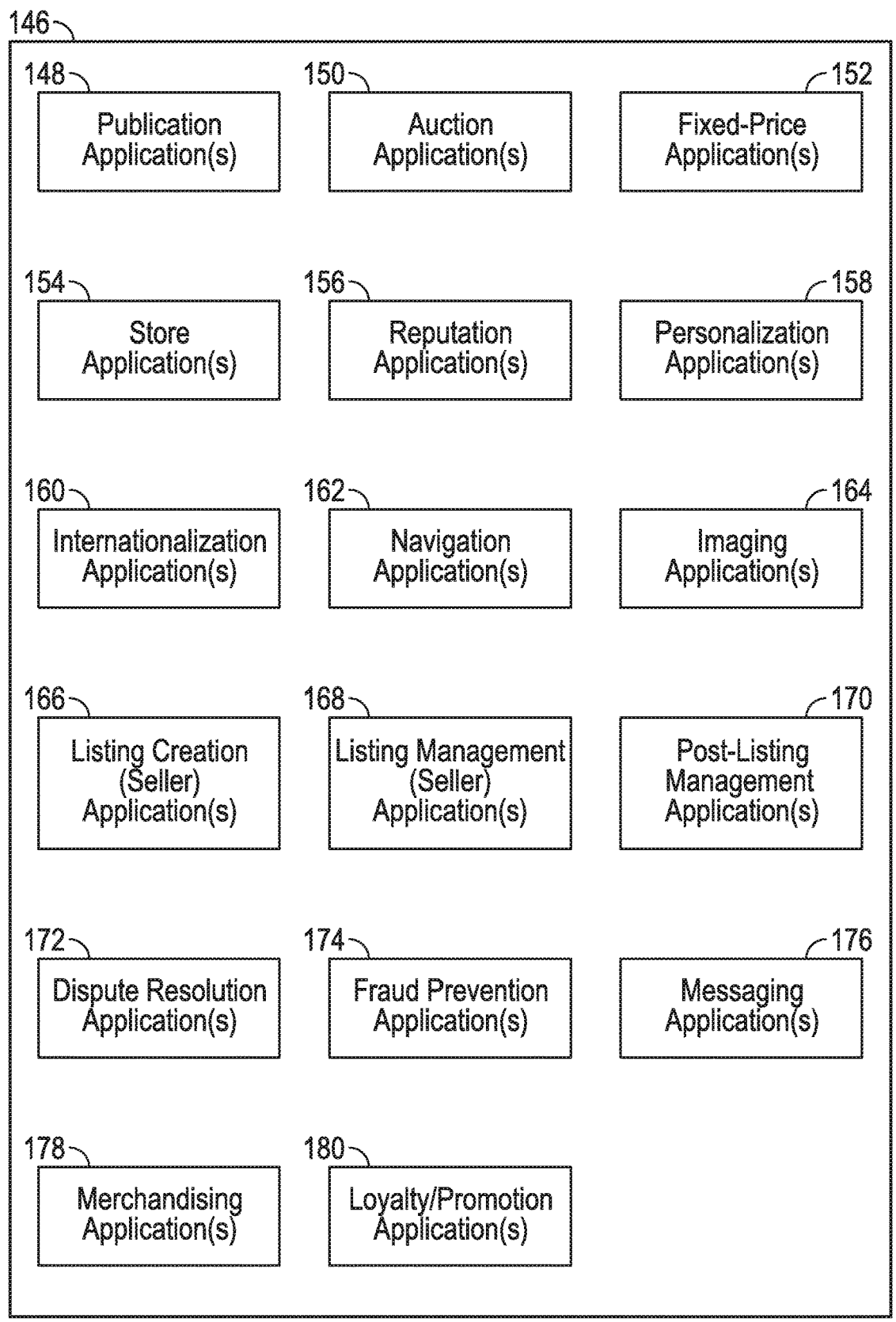
FIG. 1B is a block diagram illustrating marketplace and payment applications, in accordance with an example embodiment.

FIG. 1B is a block diagram illustrating the marketplace and payment applications 120 and 122, in accordance with an example embodiment. In one example embodiment, feedback items regarding the marketplace and payment applications 120 and 122 may be obtained from, for example, users of the marketplace and payment applications 120 and 122 and the feedback items may be mined using the techniques described herein. In one example embodiment, the marketplace and payment applications 120 and 122 are provided as part of the application server(s) 118 in the networked system 102. The marketplace and payment applications 120 and 122 may be hosted on dedicated or shared server machines (not shown) that are communicatively coupled to enable communications between the server machines. The marketplace and payment applications 120 and 122 themselves are communicatively coupled (e.g., via appropriate interfaces) to each other and to various data sources, so as to allow information to be passed between the marketplace and payment applications 120 and 122 or so as to allow the marketplace and payment applications 120 and 122 to share and access common data. The marketplace and payment applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 148 and one or more auction applications 150, which support auction-format listing and price setting mechanisms (e.g., English, Dutch, Vickrey, Chinese, Double, Reverse auctions, etc.). The various auction applications 150 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 152 support fixed-price listing formats (e.g., the traditional classified-advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed price that is typically higher than the starting price of the auction.

Store applications 154 allow a seller to group listings within a "virtual" store, which may be branded and otherwise personalized by and for the seller. Such a virtual store may also offer promotions, incentives, and features that are specific and personalized to a relevant seller.

Reputation applications 156 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 156 allow a user (for example, through feedback provided by other transaction partners) to establish a reputation within the networked system 102 over time. Other potential trading partners may then reference such a reputation for the purposes of assessing credibility and trustworthiness.

Personalization applications 158 allow users of the networked system 102 to personalize various aspects of their interactions with the networked system 102. For example a user may, utilizing an appropriate personalization application 158, create a personalized reference page at which information regarding transactions to which the user is (or has been) a party may be viewed. Further, a personalization application 158 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 160 that customize information (and/or the presentation of information by the networked system 102) according to predetermined criteria (e.g., geographic, demographic, or marketplace criteria). For example, the internationalization applications 160 may be used to support the customization of information for a number of regional websites that are operated by the networked system 102 and that are accessible via respective web servers 116.

Navigation of the networked system 102 may be facilitated by one or more navigation applications 162. For example, a search application (as an example of a navigation application 162) may enable key word searches of listings published via the networked system 102. A browsing application may allow users to browse various category, catalogue, or inventory data structures according to which listings may be classified within the networked system 102. Various other navigation applications 162 may be provided to supplement the search and browsing applications.

In order to make listings available via the networked system 102 as visually informative and attractive as possible, the marketplace and payment applications 120 and 122 may include one or more imaging applications 164, which users may utilize to upload images for inclusion within listings. An imaging application 164 also operates to incorporate images within viewed listings. The imaging applications 164 may also support one or more promotional features, such as image galleries that are presented to potential buyers. For example, sellers may pay an additional fee to have an image included within a gallery of images for promoted items.

Listing creation applications 166 allow sellers to conveniently author listings pertaining to goods or services that they wish to transact via the networked system 102, and listing management applications 168 allow sellers to manage such listings. Specifically, where a particular seller has authored and/or published a large number of listings, the management of such listings may present a challenge. The listing management applications 168 provide a number of features (e.g., auto-relisting, inventory level monitors, etc.) to assist the seller in managing such listings. One or more post-listing management applications 170 also assist sellers with a number of activities that typically occur post-listing. For example, upon completion of an auction facilitated by one or more of the auction applications 150, a seller may wish to leave feedback regarding a particular buyer. To this end, a post-listing management application 170 may provide an interface to one or more of the reputation applications 156, so as to allow the seller conveniently to provide feedback regarding multiple buyers to the reputation applications 156.

Dispute resolution applications 172 provide mechanisms whereby disputes arising between transacting parties may be resolved. For example, the dispute resolution applications 172 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 174 implement fraud detection and prevention mechanisms to reduce the occurrence of fraud within the networked system 102.

Messaging applications 176 are responsible for the generation and delivery of messages to users of the networked system 102 (such as, for example, messages advising users regarding the status of listings at the networked system 102 (e.g., providing "outbid" notices to bidders during an auction process or providing promotional and merchandising information to users)). Respective messaging applications 176 may utilize any one of a number of message delivery networks and platforms to deliver messages to users. For example, the messaging applications 176 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks 142.

Merchandising applications 178 support various merchandising functions that are made available to sellers to enable sellers to increase sales via the networked system 102. The merchandising applications 178 also operate the various merchandising features that may be invoked by sellers, and may monitor and track the success of merchandising strategies employed by sellers. The networked system 102 itself, or one or more parties that transact via the networked system 102, may operate loyalty programs that are supported by one or more loyalty/promotion applications 180. For example, a buyer may earn loyalty or promotion points for each transaction established and/or concluded with a particular seller, and be offered a reward for which accumulated loyalty points can be redeemed.

Figure 2A:
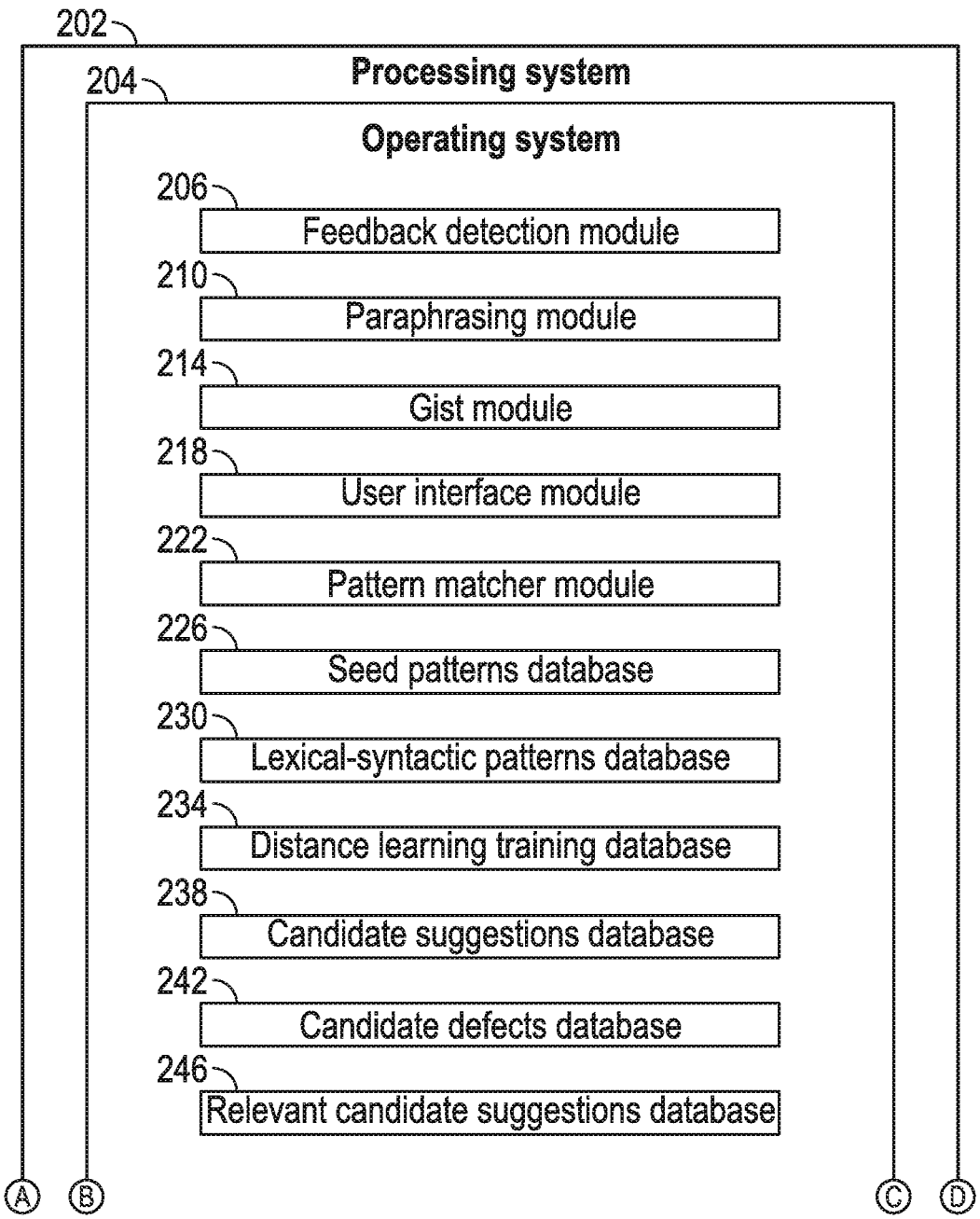
FIGS. 2A and 2B are a block diagram of an example apparatus for mining textual feedback, in accordance with an example embodiment.
Figure 2B:
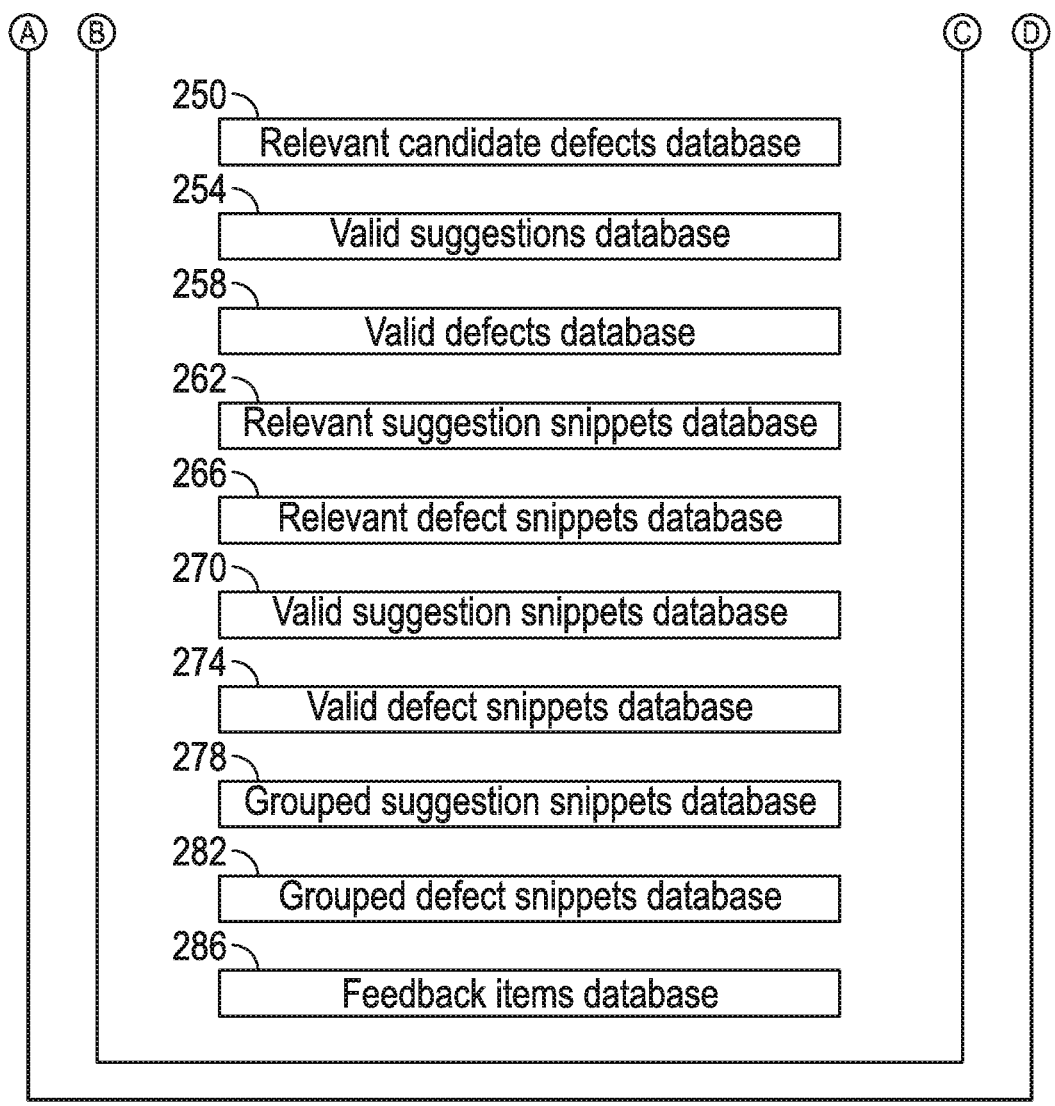

FIGS. 2A and 2B are a block diagram of an example apparatus 200 for mining textual feedback, in accordance with an example embodiment. The apparatus 200 is shown to include a processing system 202 that may be implemented on a client or other processing device, and that includes an operating system 204 for executing software instructions.

In accordance with an example embodiment, the apparatus 200 may include a feedback detection module 206, a paraphrasing module 210, a gist generation module 214, a user interface module 218, a pattern matcher module 222, a seed patterns database 226, a lexical-syntactic patterns database 230, a distance learning training database 234, a candidate suggestions database 238, a candidate defects database 242, a relevant candidate suggestions database 246, a relevant candidate defects database 250, a valid suggestions database 254, a valid defects database 258, a relevant suggestion snippets database 262, a relevant defect snippets database 266, a valid suggestion snippets database 270, a valid defect snippets database 274, a grouped suggestion snippets database 278, a grouped defect snippets database 282, and a feedback items database 286.

In one example embodiment, the feedback detection module 206 uses a machine-learning technique to process user feedback to determine if a feedback item contains a suggestion and/or a defect report. The feedback detection module 206 may obtain a number of manually defined lexical-syntactic patterns stored in the seed patterns database 226 that may be indicative of a defect report or suggestion (e.g., "there <modal verb> be an option for <verb> <determiner> <noun>"). The lexical-syntactic patterns may be derived by manually reviewing a set of feedback items. A machine-learning algorithm (e.g., a bootstrapping algorithm) may be trained based on the manually defined lexical-syntactic patterns and applied to a seed set of feedback items to identify additional lexical-syntactic patterns. The obtained set of lexical-syntactic patterns (both the manually defined lexical-syntactic patterns and the additional lexical-syntactic patterns) are stored in the lexical-syntactic patterns database 230 and are matched against the feedback corpus stored in the feedback items database 286 using the pattern matcher module 222. The feedback items matching at least one of the patterns are stored in the distance learning training database 234 and used as a training set for, for example, a distant supervision-learning technique. The distant supervision-learning technique generates a model that may be used to harvest feedback items that contain a suggestion(s) and/or a defect report(s) but which may not match any of the obtained lexical-syntactic patterns.

In one example embodiment, the output of the distant supervision-learning technique is stored in the candidate suggestions database 238 and/or the candidate defects database 242 and may be used as input for a second machine-learning system. In order to train the second machine-learning system, a sample set of feedback items matching the set of lexical-syntactic patterns is selected and manually labeled "relevant defect report" and/or "relevant suggestion" thereby indicating whether the feedback item contains a defect report and/or a suggestion. The feedback items labeled "relevant suggestion" are stored in the relevant candidate suggestions database 246 and the feedback items labeled "relevant defect report" are stored in the relevant candidate defects database 250.

A classifier may then be trained using the labeled set of feedback items to create the second model of the second machine-learning system. The second model may be used to classify each feedback item identified by the distant supervision-learning technique into "valid defect report", "valid suggestion", or "no defect report/suggestion" classes. The feedback items labeled "valid suggestion" are stored in the valid suggestions database 254 and the feedback items labeled "valid defect report" are stored in the valid defects database 258. The first system may thereby increase recall using a set of generic patterns and the second system may thereby increase precision using a small set of labeled data.

The paraphrasing module 210 identifies a text snippet(s) of each feedback item that expresses a defect report and/or suggestion (e.g., "add a button to send invoice"). For snippet extraction, a set of classifiers may be trained using different feature sets (bag-of-words, nouns, verbs, noun phrases, verb phrases) to identify the snippets (and, optionally, complete sentences) that contain a defect report and/or suggestion. Each snippet may be categorized such that snippets that have different lexical content but the same meaning may be grouped together (e.g., "add a button to send invoice" and "allow an option to send the invoice"). The paraphrasing module 210 may also segment the feedback items containing a defect report and/or suggestion into groups based on the feedback item expressing the same or a similar defect report and/or suggestion.

In one example embodiment, the valid suggestions are obtained from the valid suggestions database 254 and are manually reviewed to identify the relevant suggestion snippets. The relevant suggestion snippets are stored in the relevant suggestion snippets database 262 and a machine-learning algorithm is applied to a sample of the relevant suggestion snippets to generate a suggestion snippet extraction model. The suggestion snippet extraction model is applied to the valid suggestions in the valid suggestions database 254 to generate valid suggestion snippets that are stored in the valid suggestion snippets database 270. Similarly, the valid defect reports are obtained from the valid defects database 258 and are manually reviewed to identify the relevant defect report snippets. The relevant defect report snippets are stored in the relevant defect snippets database 266 and a machine-learning algorithm is applied to a sample of the relevant defect report snippets to generate a defect snippet extraction model. The defect snippet extraction model is applied to the valid defect reports in the valid defects database 258 to generate valid defect report snippets that are stored in the valid defect snippets database 274. The valid suggestion snippets and the valid defect report snippets are grouped, as described above. The grouped suggestion snippets are stored in the grouped suggestion snippets database 278 and the grouped defect report snippets are stored in the grouped defect snippets database 282.

For each group of feedback items, the gist generation module 414 generates a gist phrase or gist sentence (known hereinafter as a "gist") that summarizes the defect report and/or suggestion in natural language. For example, a topic modeling technique may be applied to identify the top k phrases/snippets for each group of feedback items. These topics are selected based on their probability of co-occurrence with other topics in that group. The gist generation module 214 may then apply statistical measures and linguistic processing to create an explicative sentence that summarizes the defect report and/or suggestion associated with the group.

The user interface module 218 may create a display of one or more gist phrases and/or gist sentences and, optionally, the corresponding feedback item(s) from which each gist was generated. In one example embodiment, the groups are ranked according to, for example, the number of feedback items that they contain. The ranked list may then be displayed on, for example, a rail of a web interface. For each of the groups, the explicative sentence may also be displayed. By clicking on a selected sentence, a user may display the list of the feedback items contained in the group.

Figure 3:
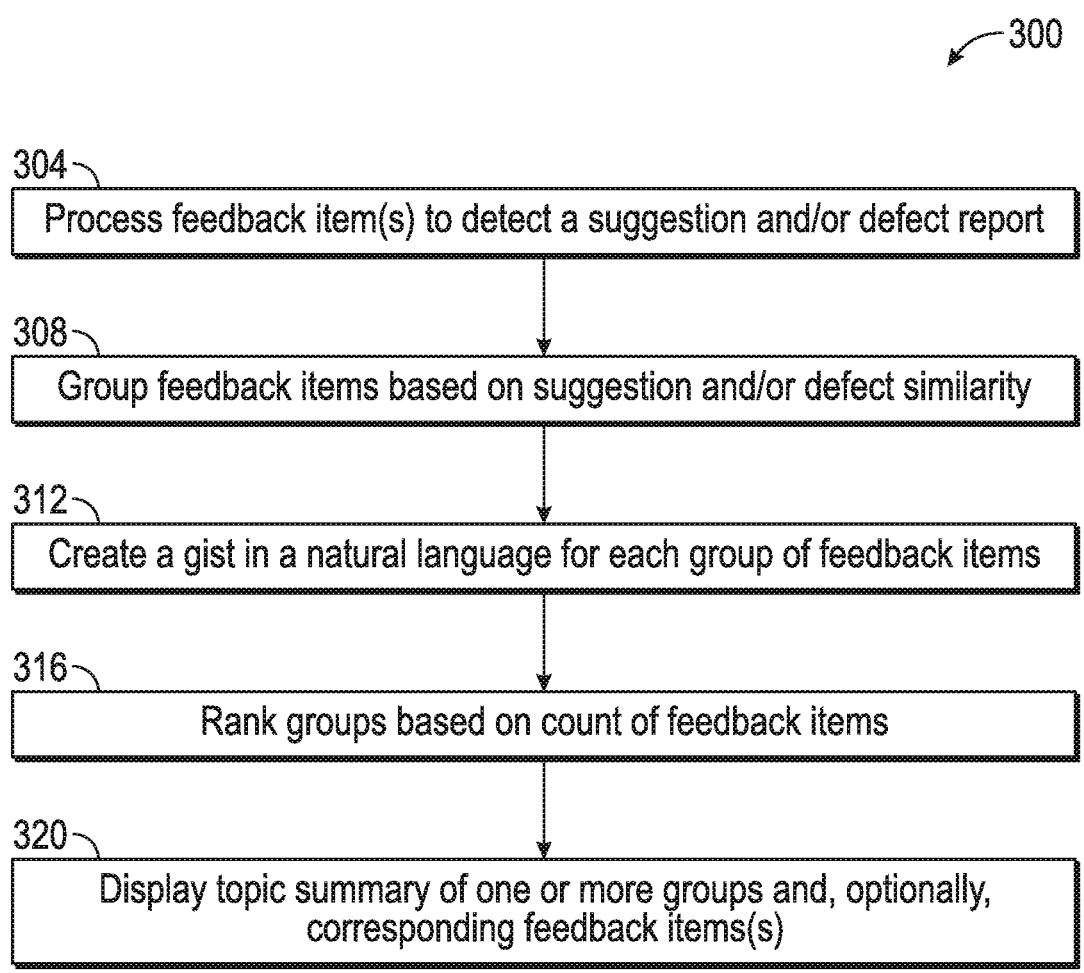
FIG. 3 is a flowchart for an example method for mining feedback, in accordance with an example embodiment.

FIG. 3 is a flowchart for an example method 300 for mining textual feedback, in accordance with an example embodiment. The method 300 may be performed by the feedback detection module 206, the paraphrasing module 210, the gist generation module 214, and/or the user interface module 218.

In one example embodiment, each feedback item may be processed to determine if the feedback item contains a defect report and/or suggestion (operation 304). The feedback items may be grouped based on the feedback item expressing the same or a similar defect report and/or suggestion (operation 308). For each group, a gist phrase or gist sentence that summarizes the defect report and/or suggestion in natural language may be created (operation 312). The groups may then optionally be ranked (optional operation 316) and one or more of the gist phrases and/or gist sentences and, optionally, the corresponding feedback item(s) from which each gist was generated, may be displayed (operation 320).

Figure 4A:
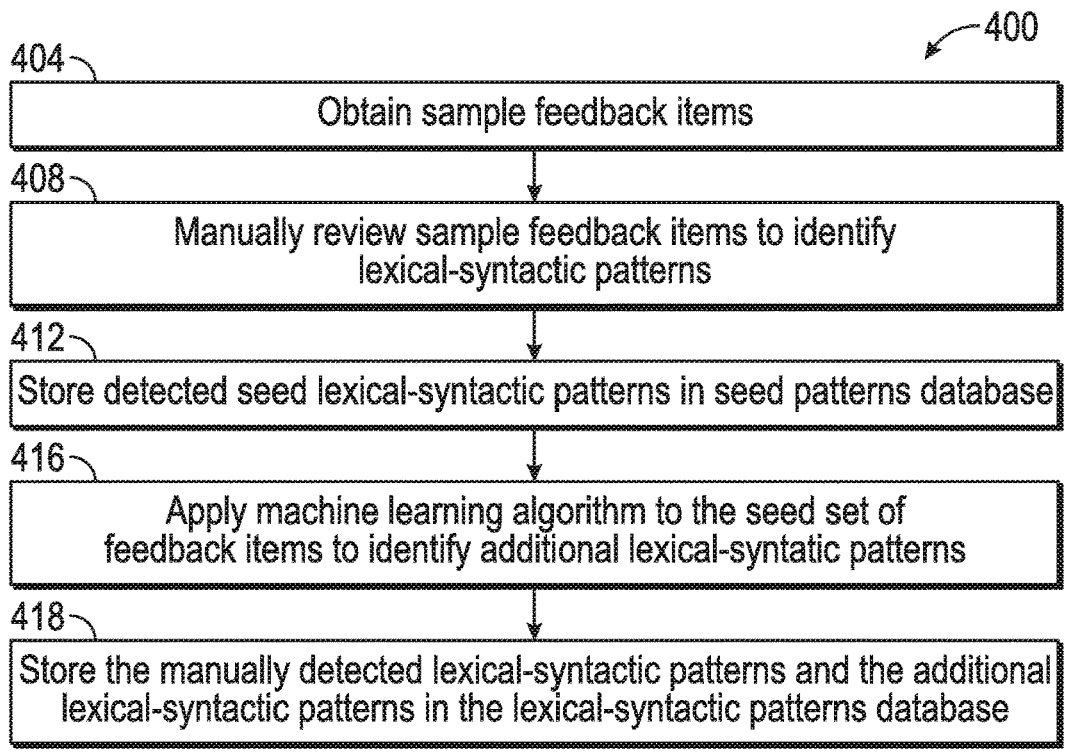
FIG. 4A is a flowchart for an example method for generating lexical-syntactic patterns, in accordance with an example embodiment.

FIG. 4A is a flowchart for an example method 400 for generating lexical-syntactic patterns, in accordance with an example embodiment. In one example embodiment, one or more of the operations of the method 400 may be performed by the feedback detection module 206 and the pattern matcher module 222.

In one example embodiment, sample feedback items are obtained from the corpus of feedback items stored in the feedback items database 286 (operation 404) and are manually reviewed to identify lexical-syntactic patterns that may identify a defect report or suggestion (operation 408). For example, the feedback items may be manually reviewed to identify a lexical-syntactic pattern such as "there <modal verb> be an option for <verb> <determiner> <noun>". The detected lexical-syntactic patterns are stored in the seed patterns database 226 (operation 412).

In one example embodiment, a machine-learning algorithm (e.g., a bootstrapping algorithm) is applied to the obtained seed set of feedback items to identify additional lexical-syntactic patterns (operation 416). The manually detected lexical-syntactic patterns and the additional lexical-syntactic patterns are stored in the lexical-syntactic patterns database 230 (operation 418).

Figure 4B:
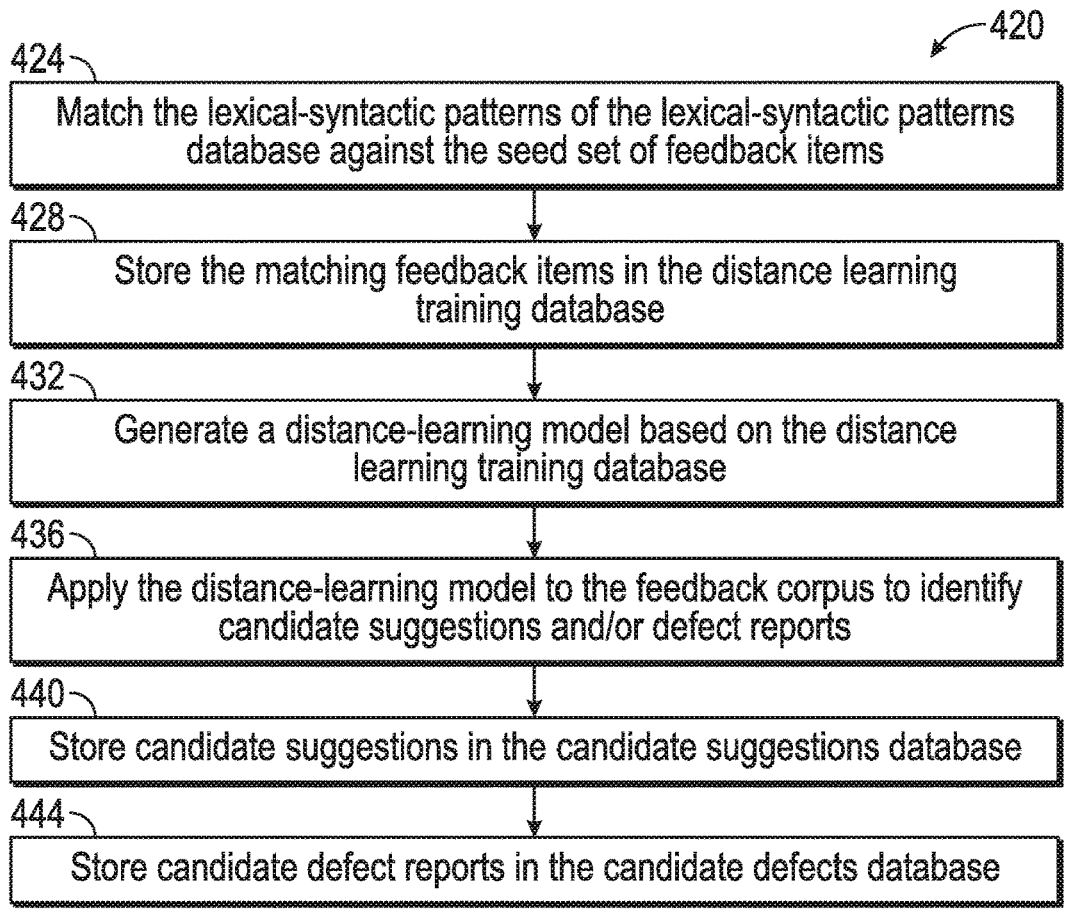
FIG. 4B is a flowchart for an example method for identifying candidate suggestions and/or defect reports in a feedback corpus, in accordance with an example embodiment.

FIG. 4B is a flowchart for an example method 420 for identifying candidate suggestions and/or defect reports in a feedback corpus, in accordance with an example embodiment. In one example embodiment, one or more of the operations of the method 420 may be performed by the feedback detection module 206.

In one example embodiment, the lexical-syntactic patterns in the lexical-syntactic patterns database 230 are matched against the seed set of feedback items using the pattern matcher module 222 (operation 424) and stored in the distance learning training database 234 (operation 428). A distant supervision-learning technique generates a distance-learning model based on the distance learning training database 234 (operation 432). The distance-learning model may be used to harvest new feedback items that contain defect reports and/or suggestions but which do not match any of the lexical-syntactic patterns in the lexical-syntactic patterns database 230. The distance-learning model is applied to the feedback corpus in the feedback items database 286 to identify candidate suggestions and/or defect reports, i.e. to identify feedback items that may contain a suggestion and/or defect report (operation 436). The candidate suggestions are stored in the candidate suggestions database 238 (operation 440) and the candidate defect reports are stored in the candidate defects database 242 (operation 444).

Figure 4C:
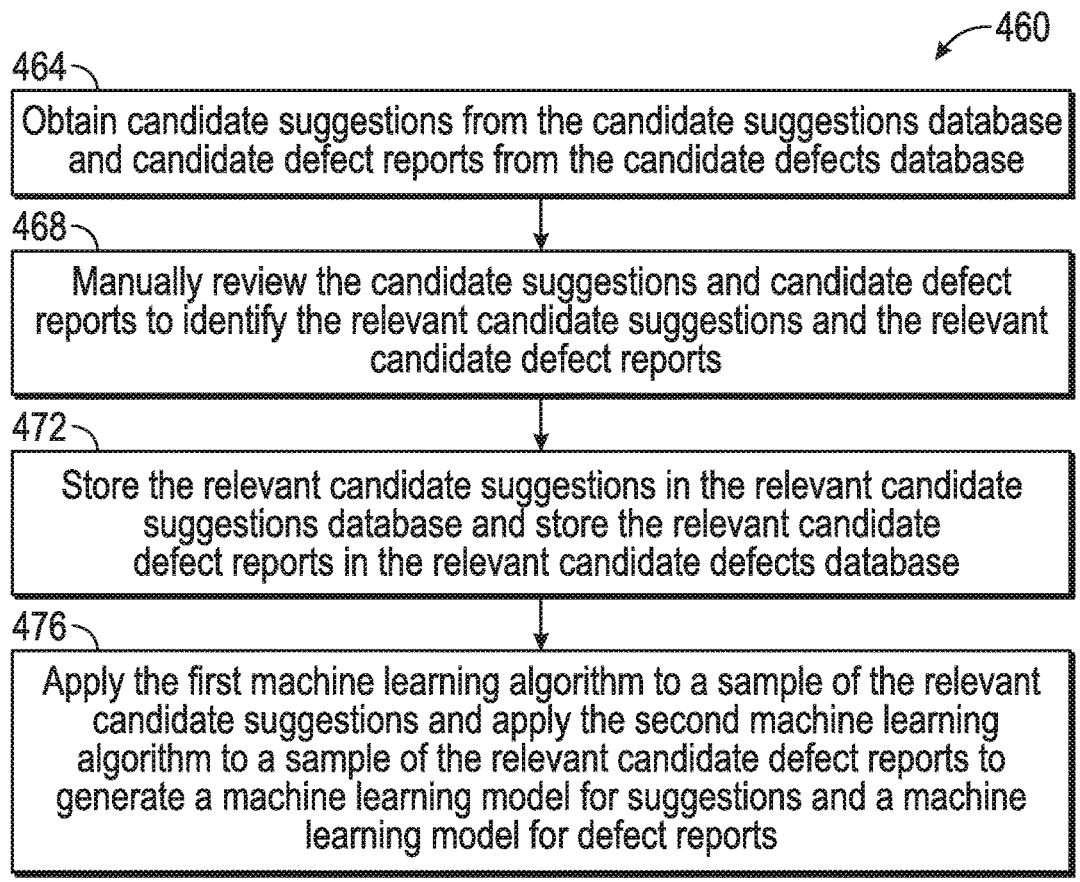
FIG. 4C is a flowchart for an example method for creating a model that identifies relevant suggestions and for creating a model that identifies relevant defect reports in a feedback corpus, in accordance with an example embodiment.

FIG. 4C is a flowchart for an example method 460 for creating a model that identifies relevant suggestions and for creating a model that identifies relevant defect reports in a feedback corpus, in accordance with an example embodiment. In one example embodiment, one or more of the operations of the method 460 may be performed by the feedback detection module 206.

In one example embodiment, the candidate suggestions are obtained from the candidate suggestions database 238 and the candidate defect reports are obtained from the candidate defects database 242 (operation 464). The candidate suggestions and candidate defect reports are manually reviewed to identify the relevant candidate suggestions and the relevant candidate defect reports (operation 468). The relevant candidate suggestions are stored in the relevant candidate suggestions database 246 and the relevant candidate defect reports are stored in the relevant candidate defects database 250 (operation 472).

In one example embodiment, a first machine-learning algorithm (e.g., a classifier) is applied to a sample of the relevant candidate suggestions in the relevant candidate suggestions database 246 and a second machine-learning algorithm (e.g., a classifier) is applied to a sample of the relevant candidate defect reports stored in the relevant candidate defects database 250 to generate a machine-learning model for suggestions and a machine learning model for defect reports, respectively (operation 476). The first machine-learning algorithm and the second machine-learning algorithm may be the same type of machine-learning algorithm or may be different types of machine-learning algorithms.

Figure 4D:
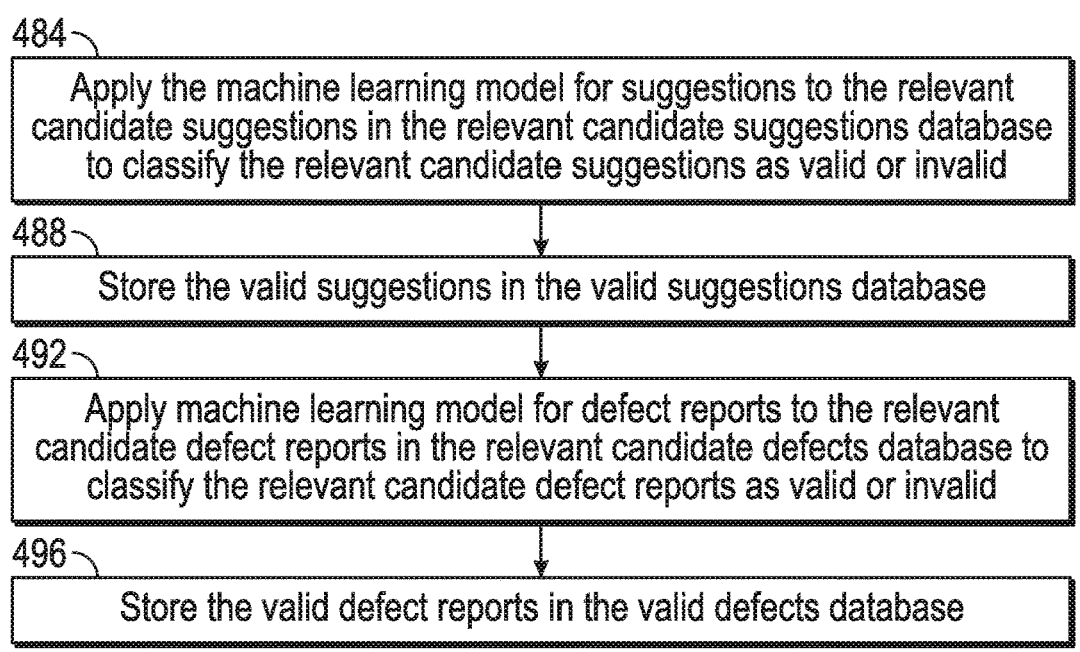
FIG. 4D is a flowchart for an example method for identifying valid suggestions and/or valid defect reports in a feedback corpus, in accordance with an example embodiment.

FIG. 4D is a flowchart for an example method 480 for identifying valid suggestions and/or valid defect reports in a feedback corpus, in accordance with an example embodiment. In one example embodiment, one or more of the operations of the method 480 may be performed by the feedback detection module 206.

In one example embodiment, the machine-learning model for suggestions is applied to the relevant candidate suggestions in the relevant candidate suggestions database 246 to classify the relevant candidate suggestions as valid or invalid (operation 484). The valid suggestions are stored in the valid suggestions database 254 (operation 488). Similarly, the machine-learning model for defect reports is applied to the relevant candidate defect reports stored in the relevant candidate defects database 250 to classify the relevant candidate defect reports as valid or invalid (operation 492). The valid defect reports are stored in a valid defects database 258 (operation 496).

Figure 5A:
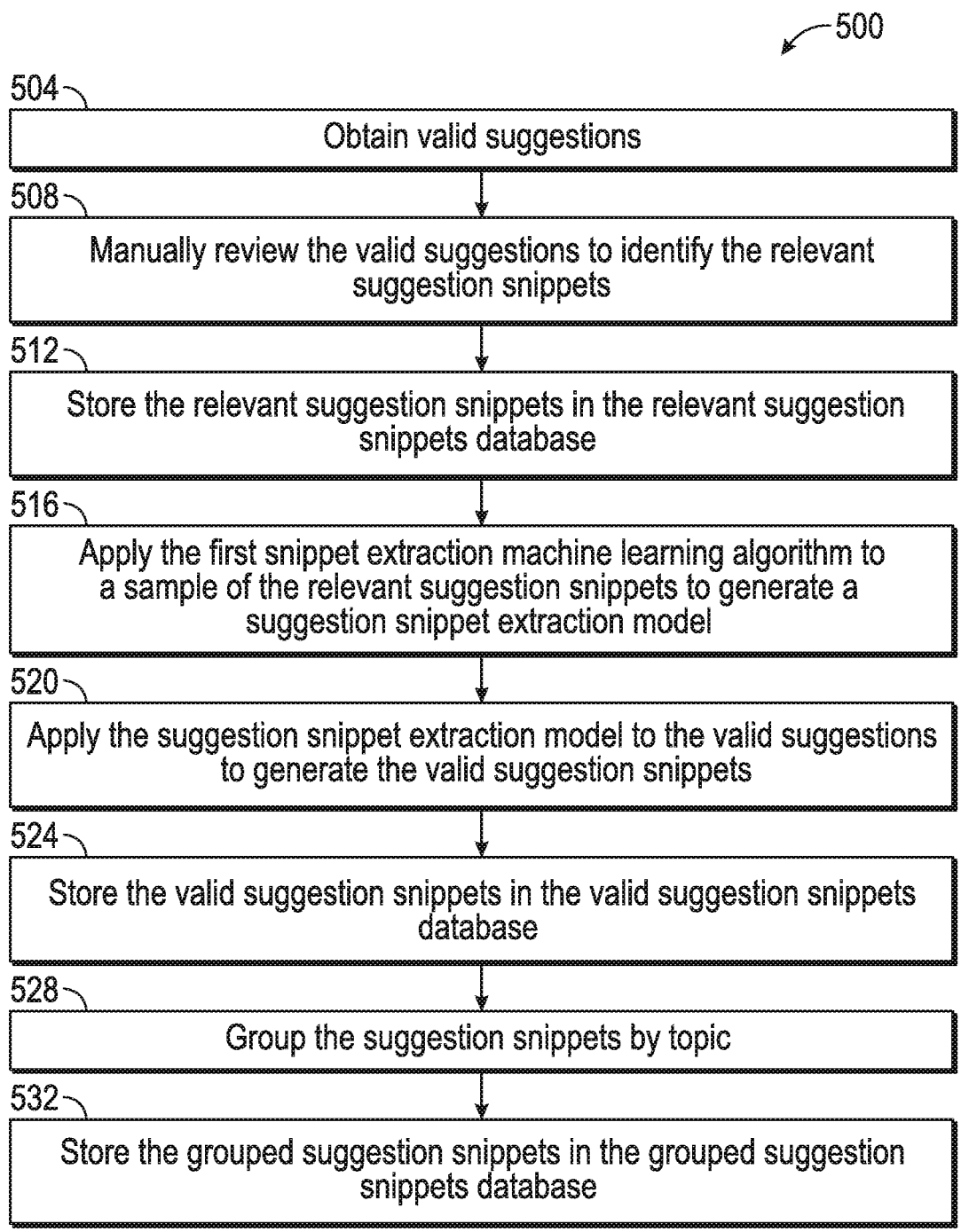
FIG. 5A is a flowchart for an example method for extracting and grouping suggestions, in accordance with an example embodiment.

FIG. 5A is a flowchart for an example method 500 for extracting and grouping suggestions, in accordance with an example embodiment. In one example embodiment, one or more of the operations of the method 500 may be performed by the paraphrasing module 210.

In one example embodiment, valid suggestions are obtained from the valid suggestions database 254 (operation 504) and are manually reviewed to identify the relevant suggestion snippets (operation 508). The relevant suggestion snippets are stored in the relevant suggestion snippets database 262 (operation 512).

In one example embodiment, a first snippet extraction machine-learning algorithm is applied to a sample of the relevant suggestion snippets in the relevant suggestion snippets database 262 to generate a suggestion snippet extraction model (operation 516). As noted above, the set of classifiers may be trained using different feature sets (bag-of-words, nouns, verbs, noun phrases, verb phrases) to identify sentences/snippets containing a defect report and/or suggestion. The suggestion snippet extraction model is applied to the valid suggestions in the valid suggestions database 254 to generate the valid suggestion snippets (operation 520). The valid suggestion snippets are stored in the valid suggestion snippets database 270 (operation 524) and are then processed to group the suggestion snippets by topic (operation 528). As noted above, each snippet may be categorized such that snippets that have different lexical content but the same meaning are grouped together. The grouped suggestion snippets are then stored in the grouped suggestion snippets database 278 (operation 532).

Figure 5B:
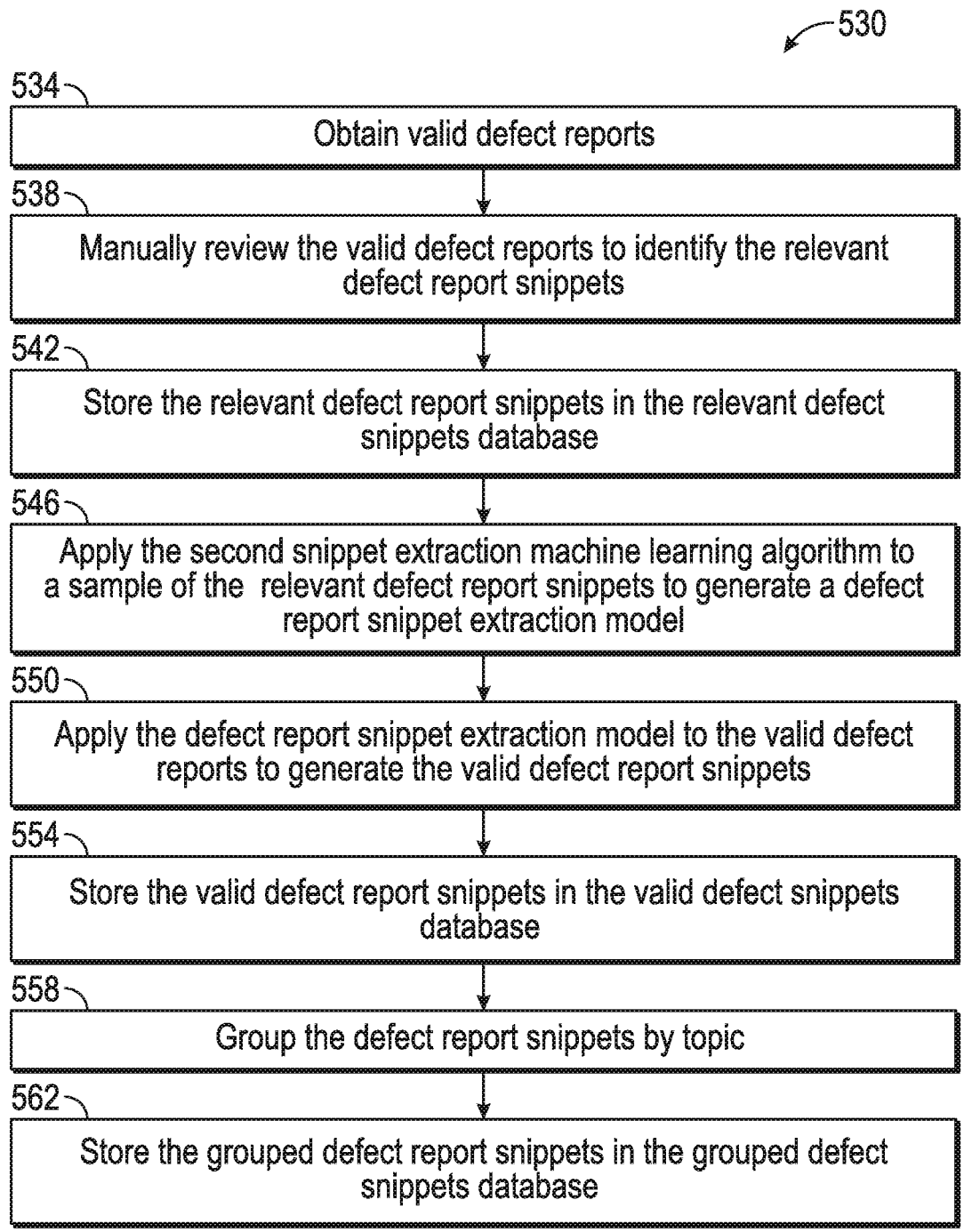
FIG. 5B is a flowchart for an example method for extracting and grouping defect reports, in accordance with an example embodiment.

FIG. 5B is a flowchart for an example method 530 for extracting and grouping defect reports, in accordance with an example embodiment. In one example embodiment, one or more of the operations of the method 530 may be performed by the paraphrasing module 210.

In one example embodiment, the valid defect reports are obtained from the valid defects database 258 (operation 534) and are manually reviewed to identify the relevant defect report snippets (operation 538). The relevant defect report snippets are stored in the relevant defect snippets database 266 (operation 542).

In one example embodiment, a second snippet extraction machine-learning algorithm is applied to a sample of the relevant defect report snippets in the relevant defect snippets database 266 to generate a defect report snippet extraction model (operation 546). The first snippet extraction machine-learning algorithm and the second snippet extraction machine-learning algorithm may be the same type of machine-learning algorithm or may be different types of machine-learning algorithms. The defect report snippet extraction model is applied to the valid defect reports in the valid defects database 258 to generate the valid defect report snippets (operation 550). The valid defect report snippets are stored in the valid defect snippets database 274 (operation 554) and are then processed to group the defect report snippets by topic (operation 558). The grouped defect report snippets are then stored in the grouped defect snippets database 282 (operation 562).

Figure 6:
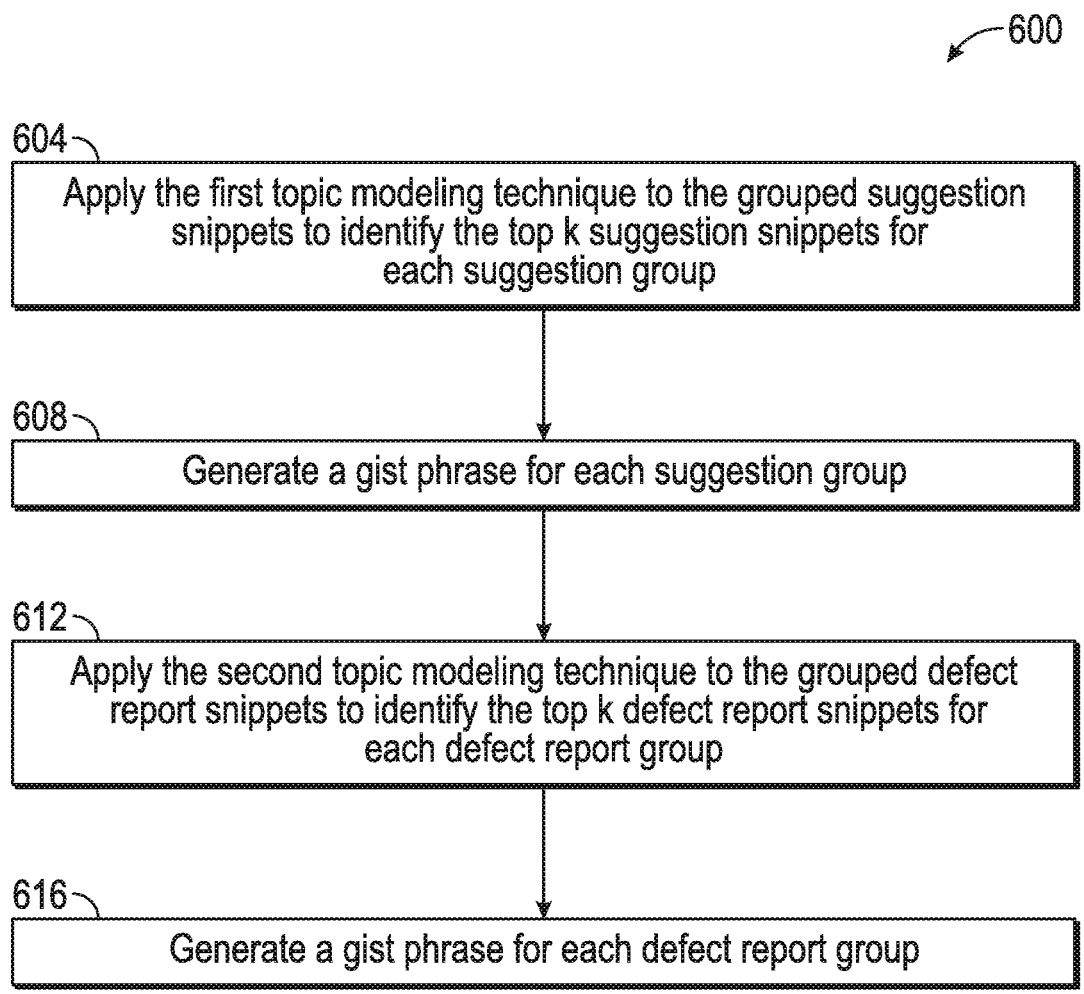
FIG. 6 is a flowchart for an example method for performing topic modeling and generating gist phrases for extracted suggestions and/or defect reports, in accordance with an example embodiment.

FIG. 6 is a flowchart for an example method 600 for performing topic modeling and generating gist phrases for extracted suggestions and/or defect reports, in accordance with an example embodiment. In one example embodiment, one or more of the operations of the method 600 may be performed by the gist generation module 214.

In one example embodiment, a first topic modeling technique using, for example, a machine-learning algorithm is applied to the grouped suggestion snippets in the grouped suggestion snippets database 278 to identify the top k suggestion snippets for each group (operation 604). The k suggestion snippets are the suggestion snippets in the group that exhibit the highest correlation. For example, the k suggestion snippets may exhibit the highest correlation in one or more keywords associated with the group. In one example embodiment, a gist phrase is generated for each group, where the gist phrase is directed to a topic associated with the group (operation 608).

Similarly, a second topic modeling technique using, for example, a machine-learning algorithm is applied to the grouped defect report snippets in the grouped defect snippets database 282 to identify the top k defect report snippets for each group (operation 612). The first topic modeling technique and the second topic modeling technique may be the same type of topic modeling technique or may be different types of topic modeling techniques. The k defect report snippets are the defect report snippets in the group that exhibit the highest correlation. For example, the k defect report snippets may exhibit the highest correlation in one or more keywords associated with the group. In one example embodiment, a gist phrase is generated for each group, where the gist phrase is directed to a topic associated with the group (operation 616).

Figure 7:
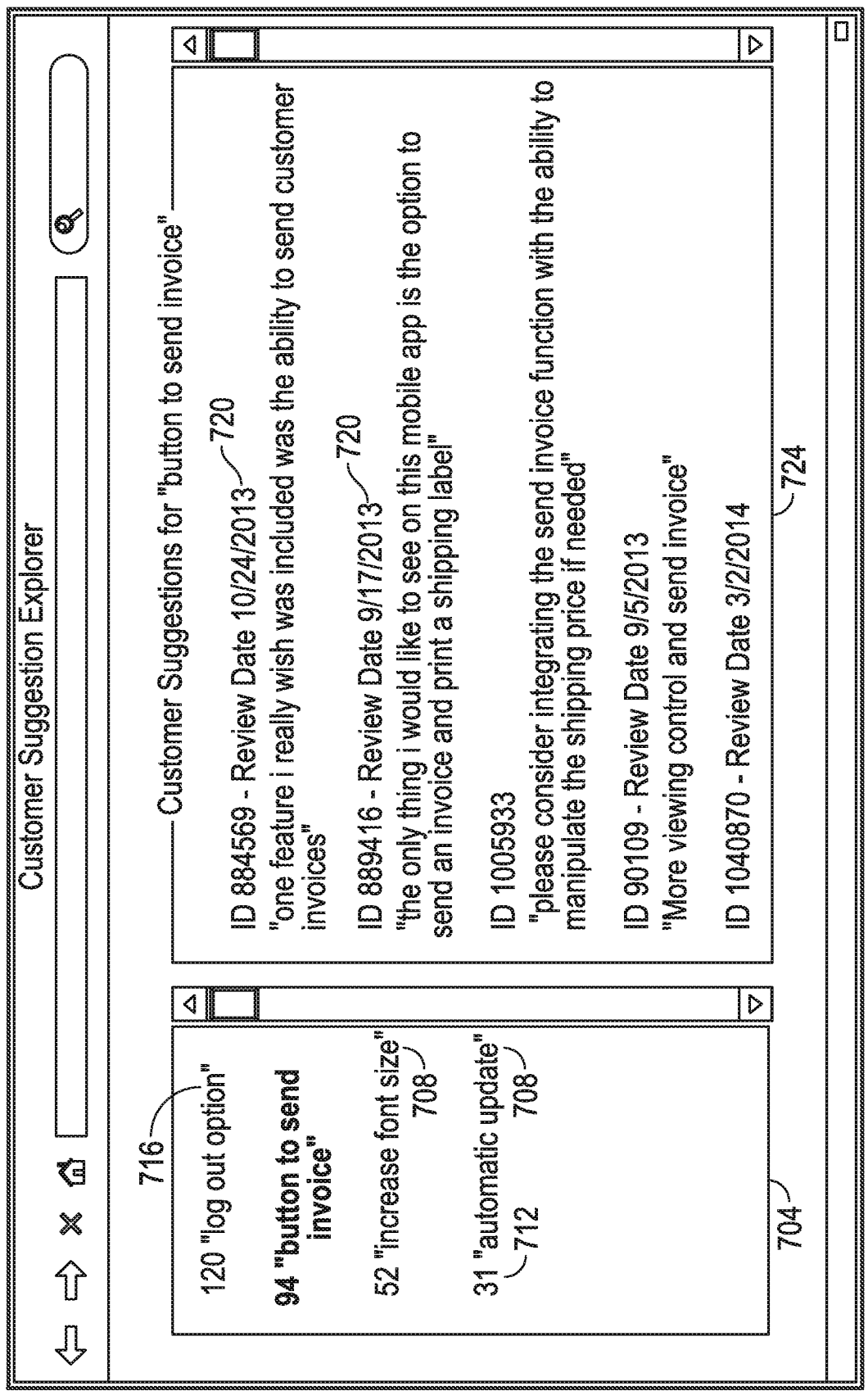
FIG. 7 is a representation of an example user interface for displaying mined suggestions and defect reports, in accordance with an example embodiment.

FIG. 7 is a representation of an example user interface 700 for displaying gist phrases and/or gist sentences, in accordance with an example embodiment. In one example embodiment, the user interface 700 may be utilized by the programmatic client 144 to enable a user to review gist phrases and/or gist sentences.

In one example embodiment, a group of topics 708 are displayed in a pane 704, each topic 708 including a count 712 of feedback items that belong to the topic 708 and a topic summary 716. A portion of feedback items 720 associated with a particular topic 708 may be displayed in a pane 724 by selecting the desired topic 708 in the pane 704.

Although certain examples are shown and described here, other variations exist and are within the scope of the invention. It will be appreciated, by those of ordinary skill in the art, that any arrangement, which is designed or arranged to achieve the same purpose, may be substituted for the specific embodiments shown. This application is intended to cover any adaptations or variations of the example embodiments of the invention described herein. It is intended that this invention be limited only by the claims, and the full scope of equivalents thereof.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, "hardware-implemented module" may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications among such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a communication network (e.g., the Internet) and via one or more appropriate interfaces (e.g., application program interfaces (APIs).)

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 8:
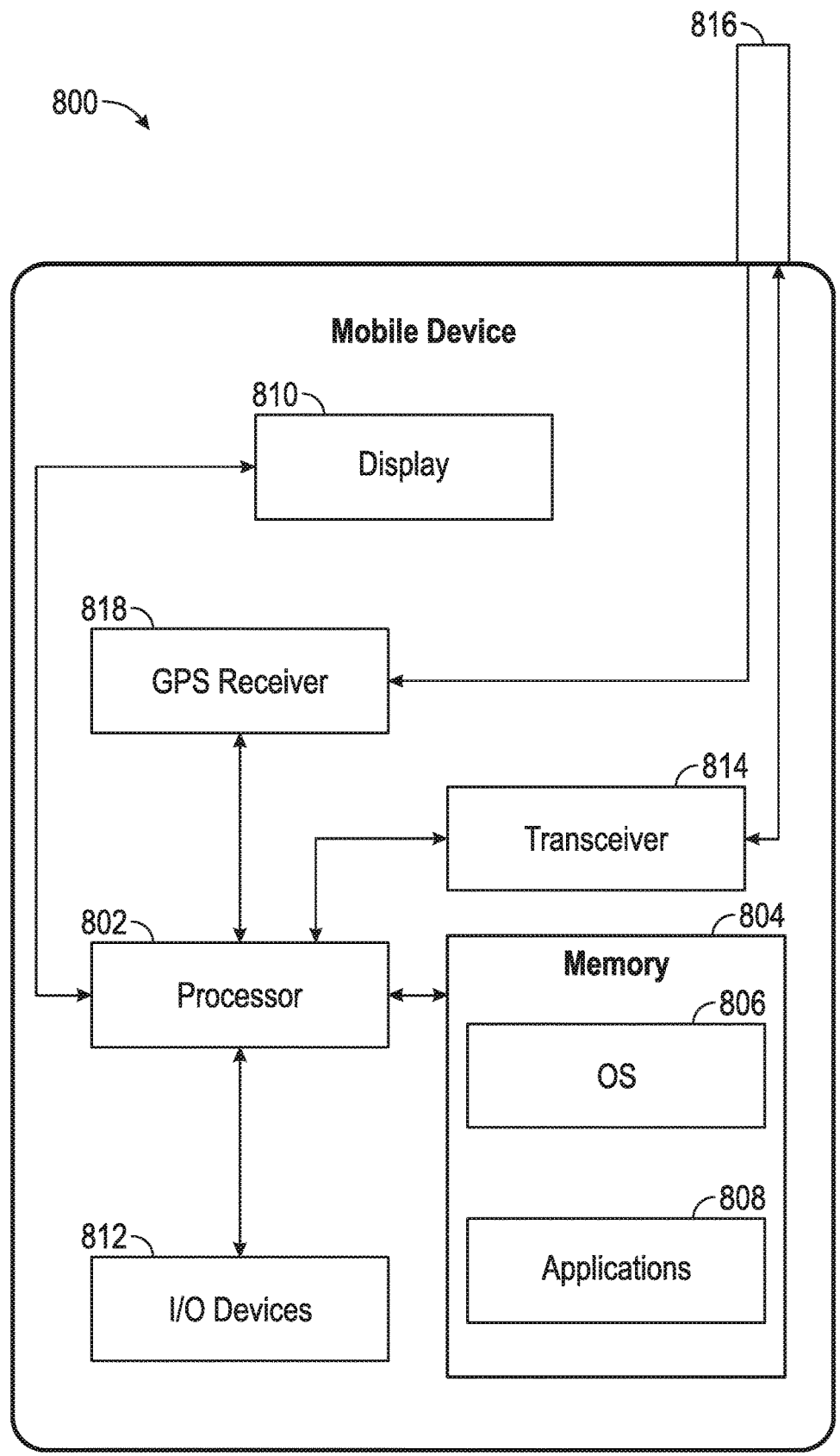
FIG. 8 is a block diagram illustrating a mobile device, according to an example embodiment.

FIG. 8 is a block diagram illustrating a mobile device 800, according to an example embodiment. The mobile device 800 can include a processor 802. The processor 802 can be any of a variety of different types of commercially available processors suitable for mobile devices 800 (for example, an XScale architecture microprocessor, a Microprocessor without Interlocked Pipeline Stages (MIPS) architecture processor, or another type of processor). A memory 804, such as a random access memory (RAM), a flash memory, or another type of memory, is typically accessible to the processor 802. The memory 804 can be adapted to store an operating system (OS) 806, as well as applications 808, such as a mobile location enabled application that can provide location based services (LBSs) to a user. The processor 802 can be coupled, either directly or via appropriate intermediary hardware, to a display 810 and to one or more input/output (I/O) devices 812, such as a keypad, a touch panel sensor, and a microphone. Similarly, in some embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 800. Further, in some configurations, a GPS receiver 818 can also make use of the antenna 816 to receive GPS signals.

Figure 9:
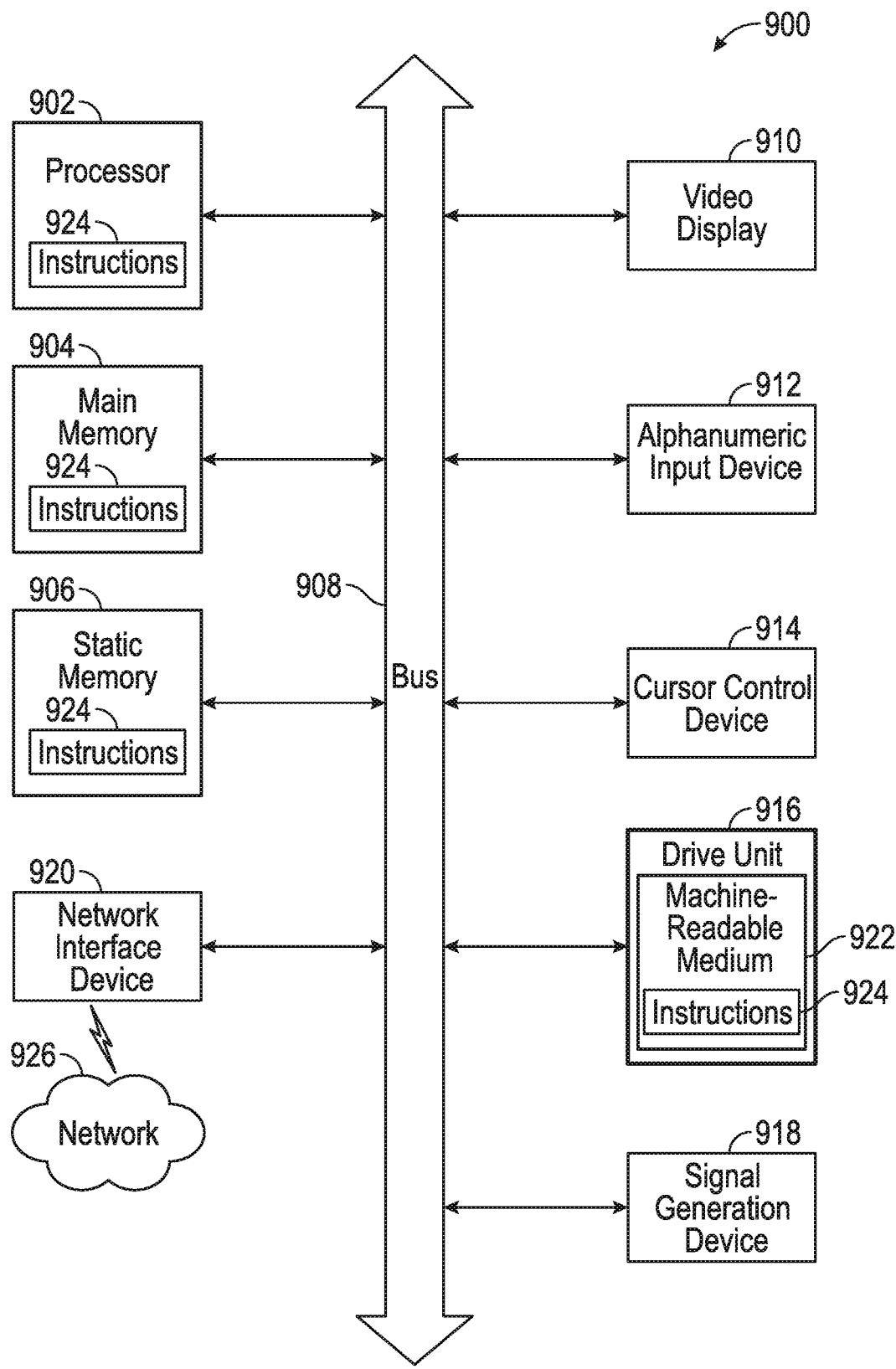
FIG. 9 is a block diagram of a machine within which instructions may be executed for causing the machine to perform any one or more of the methodologies discussed herein.

FIG. 9 is a block diagram of a machine 900 within which instructions may be executed for causing the machine to perform any one or more of the methodologies discussed herein. In one example embodiment, the machine may be the example apparatus 200 of FIG. 2 for mining feedback items. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display 910 (e.g., a liquid crystal display (LCD) or a cathode ray tube (CRT)). The computer system 900 also includes an alphanumeric input device 912 (e.g., a keyboard), a cursor control device 914 (e.g., a mouse), a drive unit 916, a signal generation device 918 (e.g., a speaker), and a network interface device 920.

Machine-Readable Medium

The drive unit 916 includes a machine-readable medium 922 on which is stored one or more sets of data structures and instructions (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more data structures or instructions 924. The term "machine-readable medium" shall also be taken to include any tangible medium that is capable of storing, encoding or carrying the instructions 924 for execution by the machine and that cause the machine to perform any one or more of the methodologies described herein, or that is capable of storing, encoding or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. Machine readable medium specifically excludes signals per se.

Transmission Medium

The instructions 924 may further be transmitted or received over a communications network 926 using a transmission medium. The instructions 924 may be transmitted using the network interface device 920 and any one of a number of well-known transfer protocols (e.g., Hypertext Transfer Protocol (HTTP)). Examples of communication networks 926 include a local area network (LAN), a WAN, the Internet, mobile telephone networks, plain old telephone (POTS) networks, and wireless data networks (e.g., WiFi and WiMax networks). The term "transmission medium" shall be taken to include any intangible medium that is capable of storing, encoding or carrying the instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings which form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for processing a plurality of feedback items, the system comprising:
   one or more hardware processors and a memory to store instructions that, when executed by the one or more hardware processors causes the one or more hardware processors to perform operations comprising:
   accessing at least one of a suggestion or a defect report;
   determining a set of one or more lexical patterns associated with the at least one of the suggestion or the defect report;
   identifying, using the set of one or more lexical patterns, one or more candidate feedback items of the plurality of feedback items that are one or more of a candidate suggestion or a candidate defect report; and
   causing presentation of a user interface to be displayed on a client device that includes a first pane and a second pane, the first pane including at least one selectable item corresponding to at least one topic, the second pane displaying the identified one or more candidate feedback items that are grouped by the at least one topic in response to receiving a selection of the at least one selectable item.

2. The system of claim 1, wherein the set of one or more lexical patterns are determined by applying a first machine-learning algorithm to a seed set of feedback items.

3. The system of claim 2, wherein the first machine-learning algorithm is a bootstrapping algorithm.

4. The system of claim 1, wherein the operations further comprise:
   accessing one or more of manually labeled relevant candidate suggestions and manually labeled relevant candidate defect reports.

5. The system of claim 4, wherein the operations further comprise:
   applying a first machine-learning technique to a subset of the relevant candidate suggestions to generate a classifying model for suggestions; and
   applying a second machine-learning technique to a subset of the relevant candidate defect reports to generate a classifying model for defect reports.

6. The system of claim 5, wherein the operations further comprise:
   classifying each of one or more of the relevant candidate suggestions as one of a valid suggestion and an invalid suggestion using the classifying model for suggestions; and
   classifying each of one or more of the relevant candidate defect reports as one of a valid defect report and an invalid defect report using the classifying model for defect reports.

7. The system of claim 1, wherein the operations further comprise:
   identifying each of one or more snippets as one or more of a relevant suggestion snippet and a relevant defect snippet.

8. The system of claim 7, wherein the operations further comprise:
applying a first snippet extraction machine-learning algorithm to a subset of the relevant suggestion snippets to generate a suggestion snippet extraction model; and
applying a second snippet extraction machine-learning algorithm to a subset of the relevant defect snippets to generate a defect snippet extraction model.

9. The system of claim 8, wherein the operations further comprise:
applying the suggestion snippet extraction model to valid suggestions to generate one or more valid suggestion snippets; and
applying the defect snippet extraction model to valid defect reports to generate one or more valid defect report snippets.

10. The system of claim 9, wherein the operations further comprise:
grouping the valid suggestion snippets and the valid defect report snippets by type into one or more groups.

11. The system of claim 10, wherein the operations further comprise:
applying a topic modeling technique to identify a top number snippets for each group of the one or more groups of valid suggestion snippets and valid defect report snippets based on a probability of co-occurrence with other topics in the group.

12. The system of claim 11, wherein the operations further comprise:
generating a gist for each group that summarizes a topic for the group.

13. The system of claim 12, wherein the operations further comprise:
applying statistical measures and linguistic processing to create an explicative sentence that summarizes the topic associated with each group.

14. A method for processing a plurality of feedback items, the method comprising:
accessing at least one of a suggestion or a defect report;
determining a set of one or more lexical patterns associated with the at least one of the suggestion or the defect report;
identifying, using the set of one or more lexical patterns, one or more candidate feedback items of the plurality of feedback items that are one or more of a candidate suggestion or a candidate defect report; and
causing presentation of a user interface to be displayed on a client device that includes a first pane and a second pane, the first pane including at least one selectable item corresponding to at least one topic, the second pane displaying the identified one or more candidate feedback items that are grouped by the at least one topic in response to receiving a selection of the at least one selectable item.

15. The method of claim 14, wherein the set of one or more lexical patterns are manually determined.

16. The method of claim 14, wherein the set of one or more lexical patterns are determined by applying a first machine-learning algorithm to a seed set of feedback items.

17. The method of claim 14, further comprising:
manually labeling each of the one or more candidate feedback items as one or more of a relevant candidate suggestion and a relevant candidate defect report.

18. The method of claim 17, further comprising:
applying a first machine-learning technique to a subset of the relevant candidate suggestions to generate a classifying model for suggestions; and
applying a second machine-learning technique to a subset of the relevant candidate defect reports to generate a classifying model for defect reports.

19. The method of claim 18, further comprising:
classifying each of one or more of the relevant candidate suggestions as one of a valid suggestion and an invalid suggestion using the classifying model for suggestions; and
classifying each of one or more of the relevant candidate defect reports as one of a valid defect report and an invalid defect report using the classifying model for defect reports.

20. A non-transitory computer-readable medium embodying instructions that, when executed by one or more processors of a machine, cause the machine to perform operations comprising:
accessing at least one of a suggestion or a defect report;
determining a set of one or more lexical patterns associated with the at least one of the suggestion or the defect report;
identifying, using the set of one or more lexical patterns, one or more candidate feedback items of a plurality of feedback items that are one or more of a candidate suggestion or a candidate defect report; and
causing presentation of a user interface to be displayed on a client device that includes a first pane and a second pane, the first pane including at least one selectable item corresponding to at least one topic, the second pane displaying the identified one or more candidate feedback items that are grouped by the at least one topic in response to receiving a selection of the at least one selectable item.

* * * * *